United States Patent [19]

Boyer et al.

[11] Patent Number: 4,846,073
[45] Date of Patent: Jul. 11, 1989

[54] SELECTIVE DELIVERY ARRANGEMENT FOR SELF PROPELLED PALLET VEHICLES

[75] Inventors: Michael R. Boyer; James F. Foster, both of Lansing; Jack D. Gyger, Charlotte, all of Mich.

[73] Assignee: Roberts Corporation, Lansing, Mich.

[21] Appl. No.: 171,087

[22] Filed: Mar. 21, 1988

[51] Int. Cl.$^4$ .......................... B61J 3/04; B61K 7/18
[52] U.S. Cl. ..................................... 104/88; 104/130; 104/305; 104/254
[58] Field of Search ................. 104/88, 130, 305, 195, 104/295, 288, 141, 96, 104, 249, 254; 246/427, 419, 417, 415 R; 105/146, 147; 180/274, 275, 279

[56] References Cited

U.S. PATENT DOCUMENTS

| | | | |
|---|---|---|---|
| 1,533,632 | 4/1925 | Butorac | 246/170 |
| 3,078,810 | 2/1963 | Bradt et al. | 104/88 |
| 3,174,439 | 3/1965 | Edgar et al. | 104/88 |
| 3,265,013 | 8/1966 | Czarnecki | 104/88 X |
| 3,451,350 | 6/1969 | Bryson | 104/88 |
| 3,560,922 | 2/1971 | Wilson | 180/279 X |
| 3,673,967 | 7/1972 | Kropf | 104/88 |
| 3,935,820 | 2/1976 | Lancaster | 104/88 |
| 3,988,991 | 11/1976 | Swartz | 104/88 |
| 4,137,984 | 2/1979 | Jennings et al. | 180/274 X |

Primary Examiner—Robert B. Reeves
Assistant Examiner—Joseph D. Pape
Attorney, Agent, or Firm—John R. Benefiel; Raymond J. Eifler

[57] ABSTRACT

Self propelled pallet vehicles (12a) are guided along a track network (10) by downwardly projecting guide pins (350, 352) carried by each pallet vehicle (12) which engage slots (354, 358) in the track network and steer the pallet vehicle (12) along the track network (10). The track network has main (20) and branch (22) track sections, and selective delivery of the vehicles to various destinations along the track network (10) is achieved by controlling the position of the guide pins (350, 352) between alternate rotated raised and lowered positions. In the lowered position the guide pins (350, 352) interact with the track network (10) to guide the pallet vehicle (12) into a branch section (20) of the track. In the raised position, the guide pins (350, 352) cause continued movement of the vehicle (12) along the main track section (22) and past a junction (38). The guide pin position may be controlled by a photoemitter (364) at the junction (38), or by various other alternatives.

17 Claims, 15 Drawing Sheets

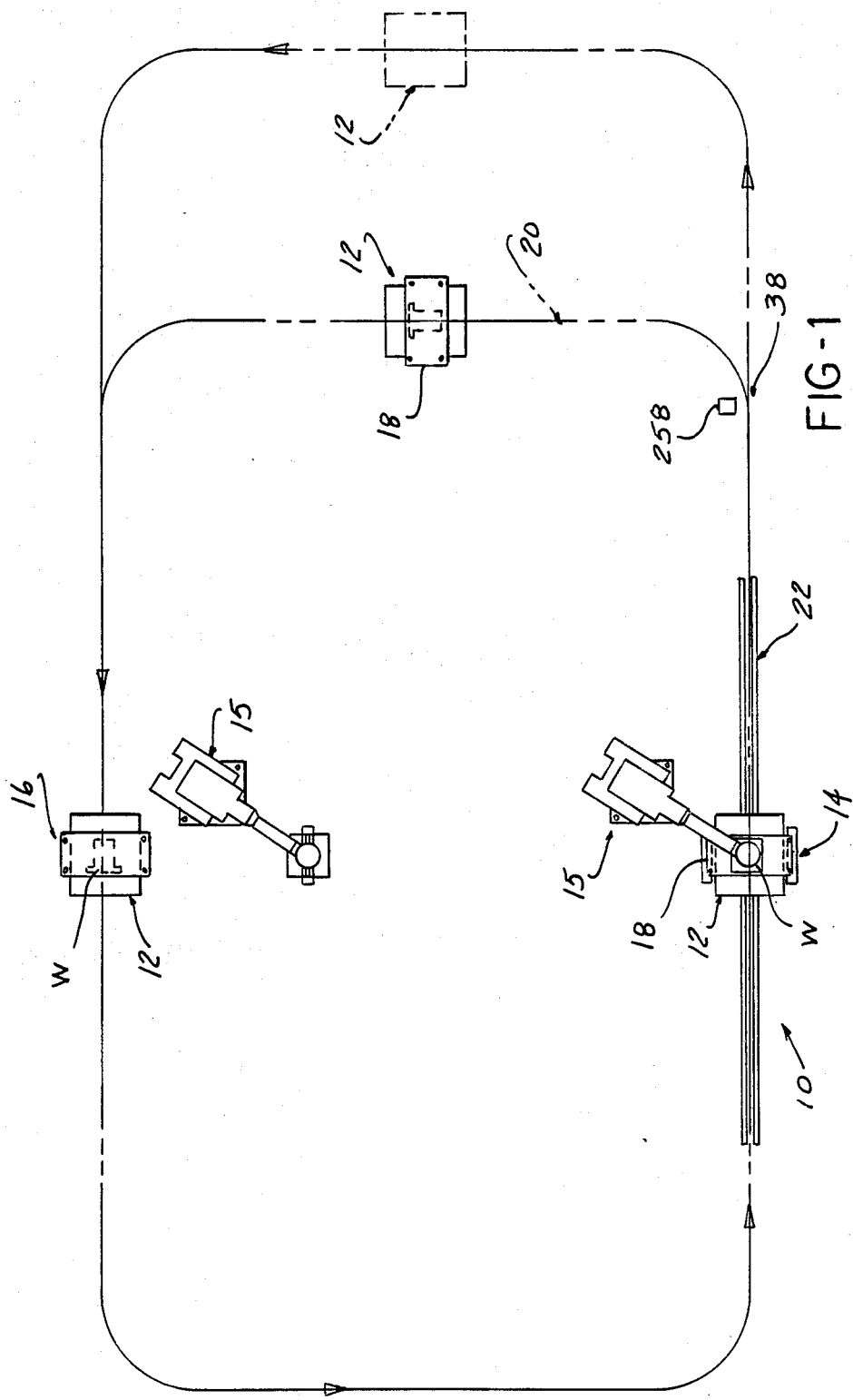

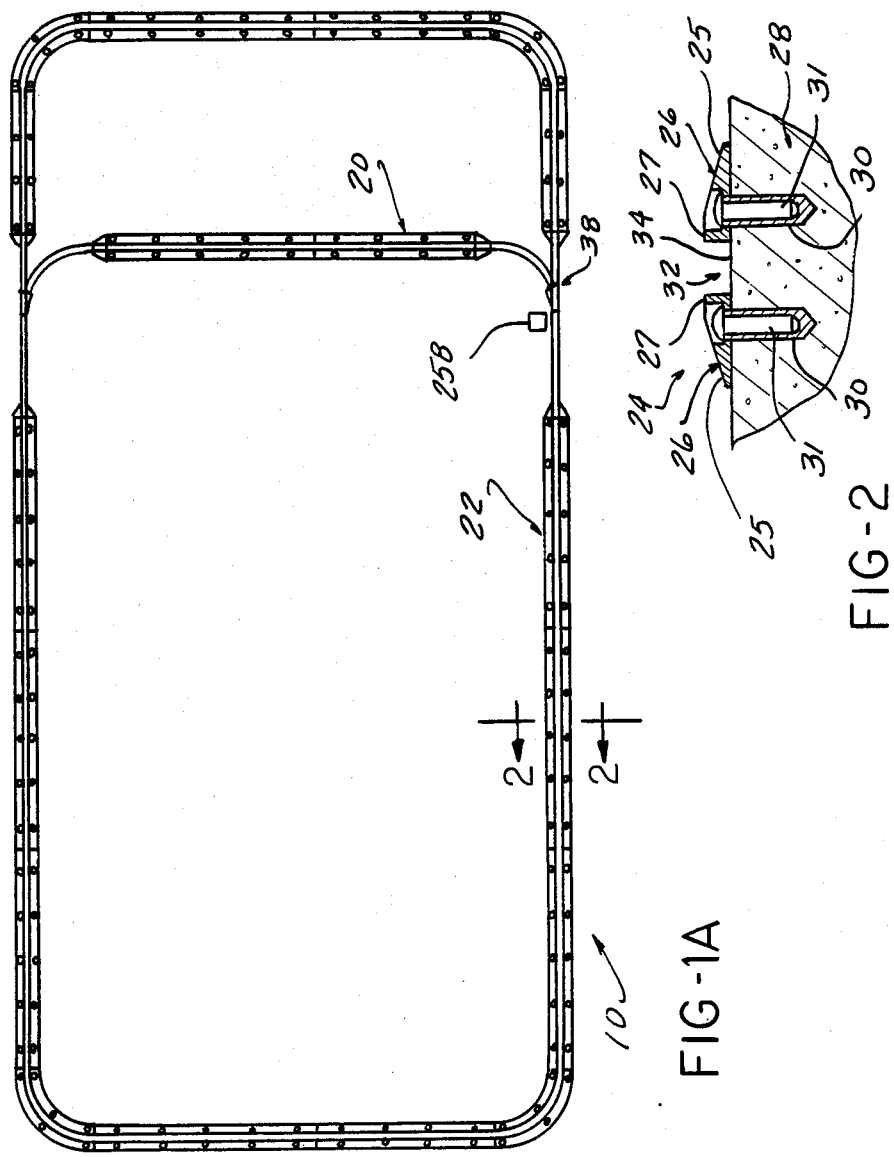

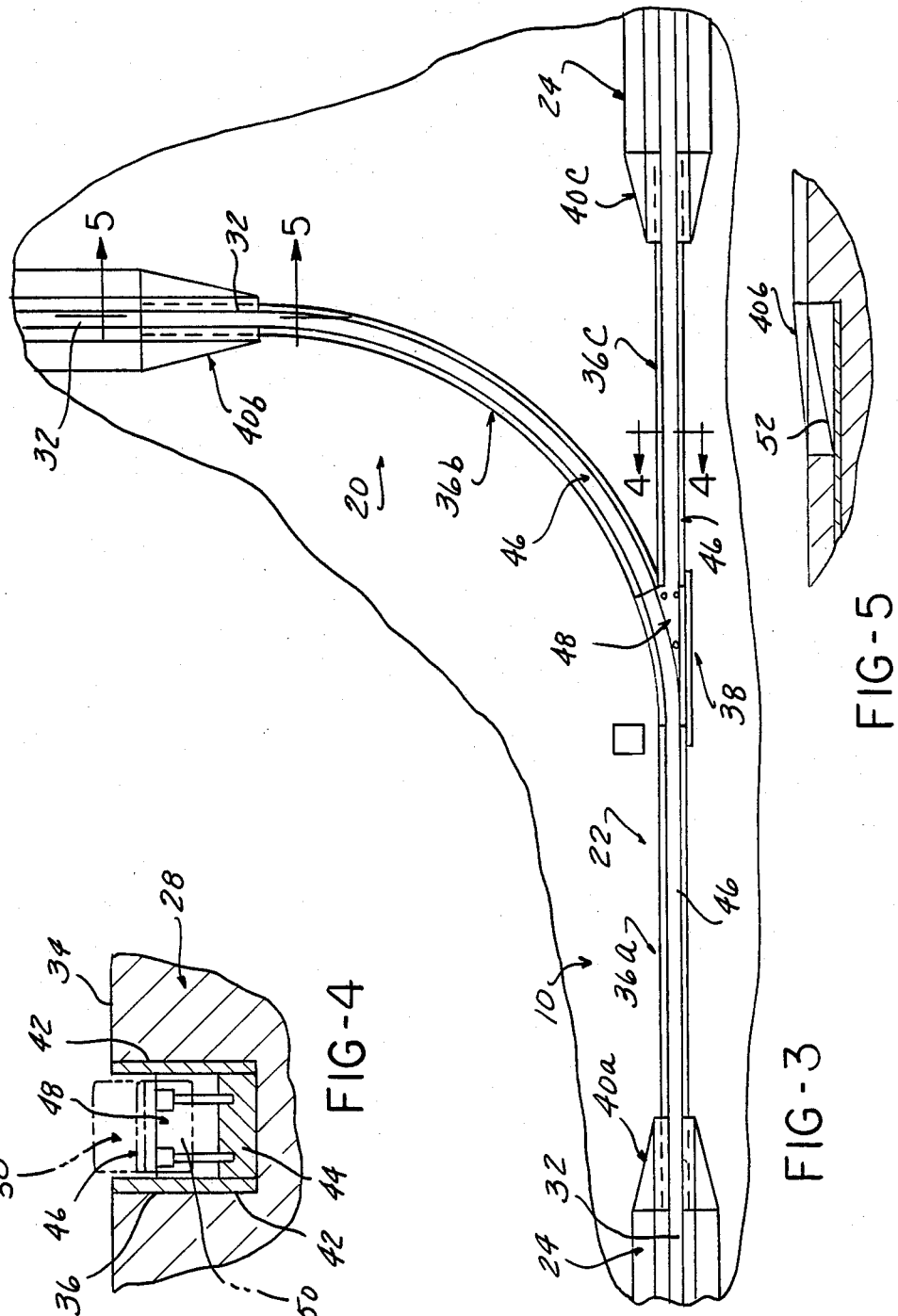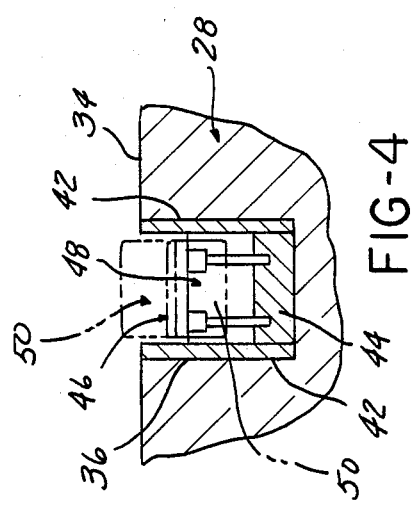

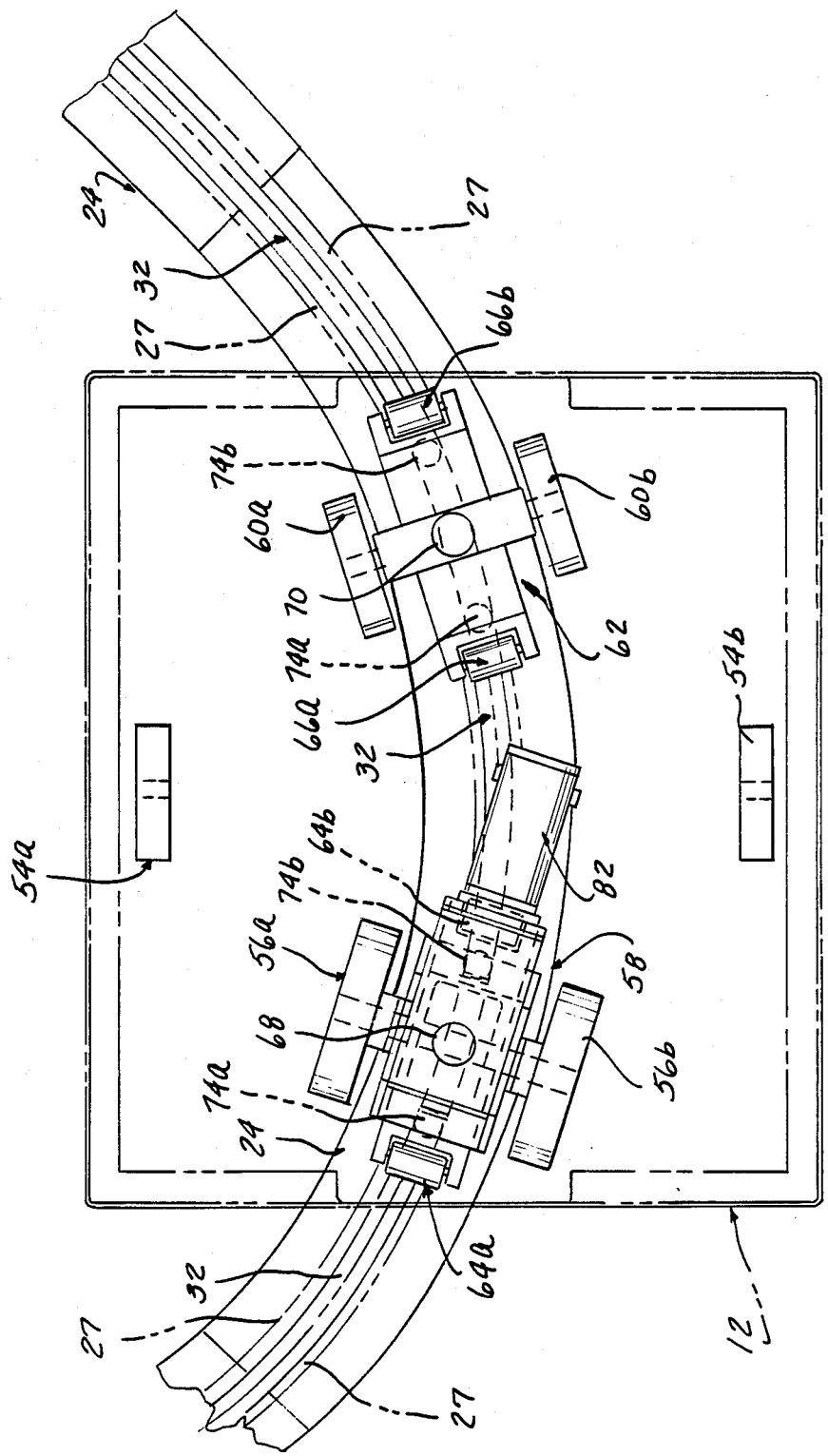

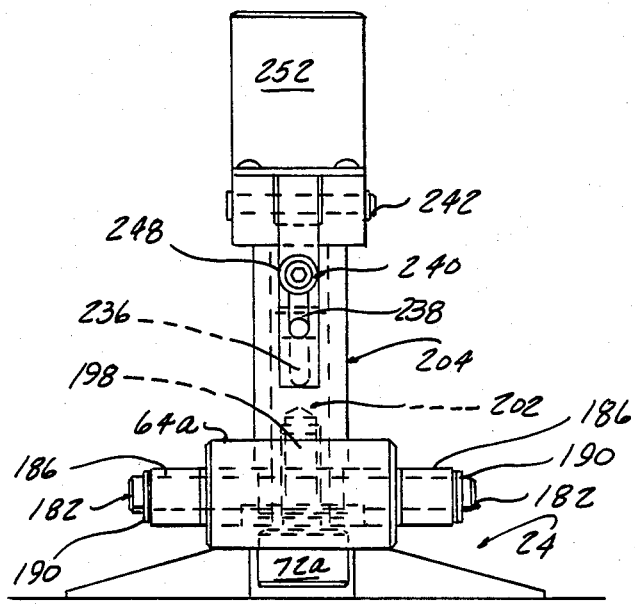
FIG-10
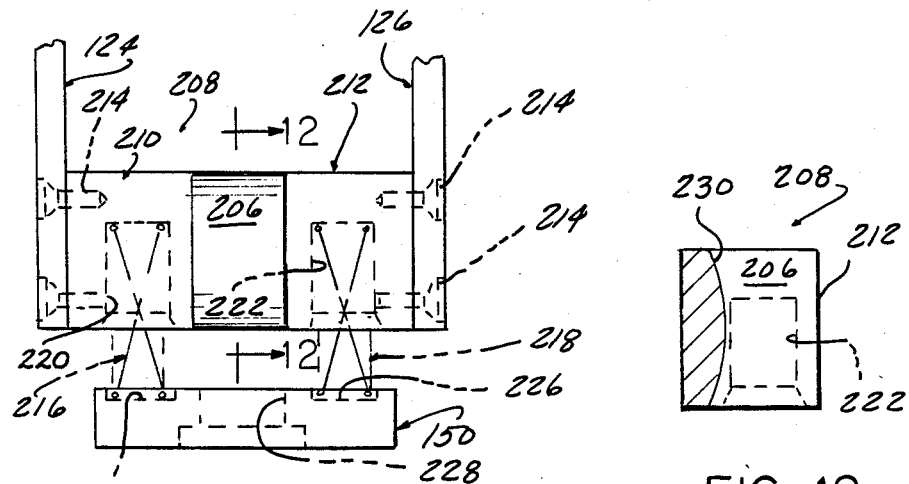
FIG-11
FIG-12

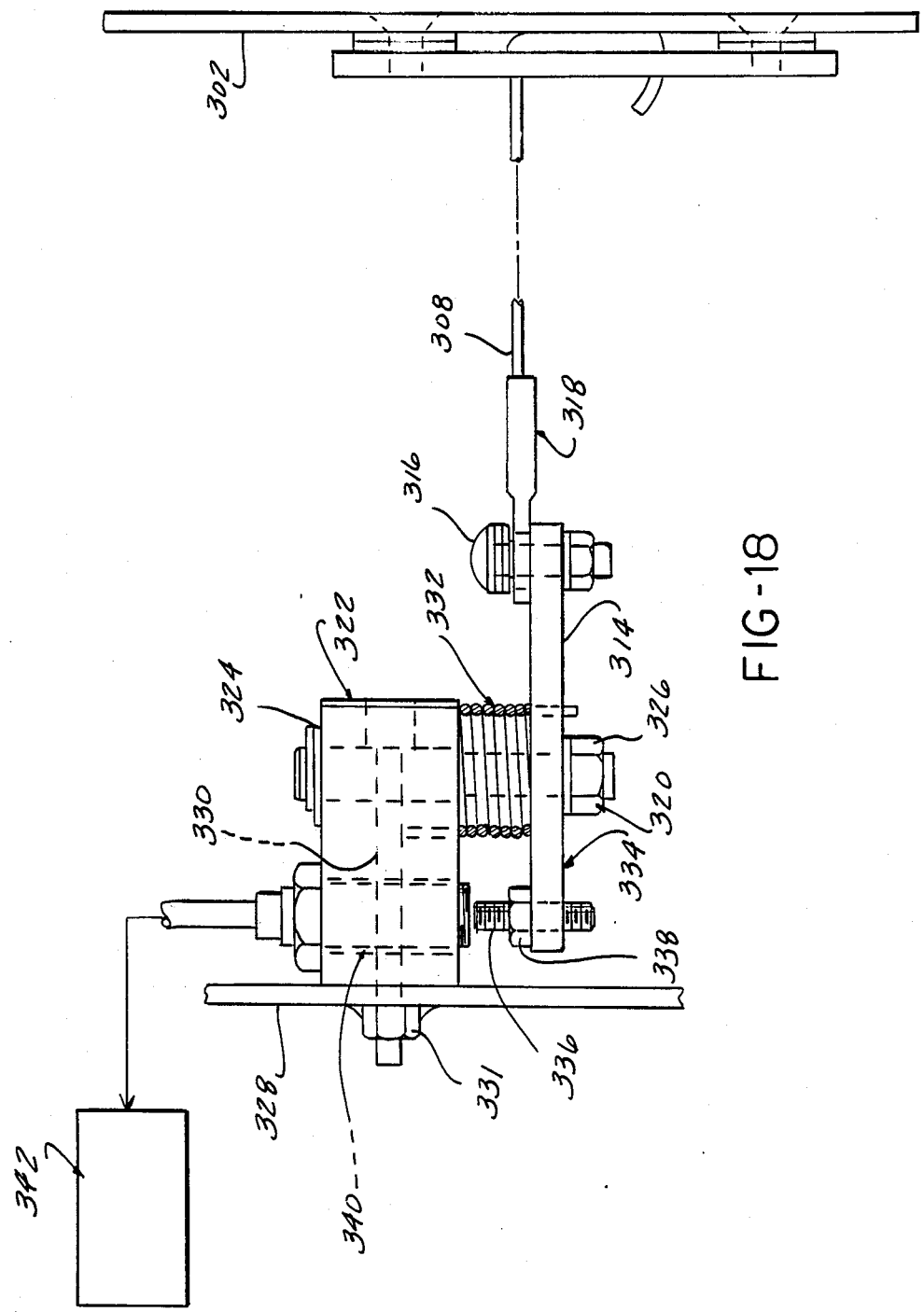

SELECTIVE DELIVERY ARRANGEMENT FOR SELF PROPELLED PALLET VEHICLES

This invention relates to self propelled vehicles used to carry conveyor pallets and particularly to such vehicles which may be selectively delivered to various destinations along different paths of a track network.

It is often desirable to be able to selectively direct self-propelled vehicles to various alternate locations along a track or guideway network. It has been known to use vehicles guided by a magnetic sensor in the vehicles which follow a wire strip buried in a factory floor or roadway, with electronically controlled routing to different destinations. Such guiding arrangement has the disadvantage of requiring wiring to be buried in the floor, and such guiding control is not failsafe because vehicles can leave the wire strip network and get "lost", presenting a hazard to equipment in the area.

It is also well known to route chain driven wheeled pallets and also self propelled vehicles by means of electromechanically actuated track switches disposed along a slotted trackway used to guide the vehicles by guide pins engaging the slot.

The use of electromechanical devices incorporated into the track network is disadvantageous as it also requires buried wires. Also present is the problem of reliability as foreign objects may cause a malfunction of the exposed switching devices. This is particularly a problem in the environment of a busy factory floor, especially where metal cutting operations are conducted, generating chips and other debris.

Mechanically guided vehicles do have the advantage of being simpler and more reliable, and it would be advantageous to provide a simple, mechanically controlled routing of self propelled vehicles, but which does not require electromechanical components disposed along or in the trackway.

SUMMARY OF THE INVENTION

A selective delivery arrangement for self-propelled wheeled vehicles constitutes the present invention, adapted to systems in which the vehicles are mechanically guided along a track network having a main and branch sections establishing alternate paths within the track network. The vehicle is steered into one or the other of alternate paths at junctions of the main and branch track sections by selectively controlled alternate positioning of guide pins carried on the vehicle. The guide pins in one alternate position steer the vehicle into the branch track section, and in the other alternate position they steer the vehicle along the main track.

In a first embodiment of the invention, the guide pins are vertically movable, and in an "up" position extend only to the depth of a normal depth slot extending along the main track section. In a "down" position the pins extend into a slot having a greater than normal depth. A switching cam at each divergent branch section blocks continued movement of guide pins in the "down" position along the shallow depth slot of the main track section. The switching cam is curved to steer the vehicles into the deeper slot of the branch track section. Alternatively, if the lead guide pins are in the "up" position they pass over the switching cam and thus are able to continue along the shallow depth slot of the main track section.

In the first embodiment, the guide pin position is controlled by operation of a solenoid carried on the vehicle, which is triggered by a simple magnetic field generating device at the junction of the main and branch track sections. Such device may be comprised of a movable permanent magnet placed at the junction, or a permanently positioned electromagnet controllably energized to trigger a reed switch in turn controlling power to the solenoid by an on-board control circuit.

In a second embodiment, the guide pins are located on either side of the vehicle and are rotatable between raised and lowered positions. The guide pins are engagable if in a lowered position with track slots in a respective one of a side-by-side pair of track rails. At junctions of the main track section with a branch track section, the track rail on the side of the direction of the turn of the branch section diverges from the main track sections, leaving a gap on that side in the main track section, while the track rail on the opposite side continues uninterrupted. The guide pins on either side are selectively positionable in a rotated up or down position respectively to engage one or the other track rail at the junctions causing guiding into a branch section or along the main section of the track network. Photoemitters at the junctions are employed to trigger photodetectors on the pallet vehicles, controlling an actuator driving the guide pins to either alternate position.

A bumper switching arrangement is included, in which a flexible strip formed in an arch about the front end of each vehicle is connected to tension a cable activating a switching arrangment controlling activation of the vehicle drive motor, allows queing of the vehicles for accumulation thereof, or to prevent collisions with objects in the path of a pallet proceeding along the track network.

Floor brush shields block entrance of debris beneath the pallet to prevent pallet tipping and movement of the guide pins out of the guide slots.

The present invention has the advantage that the moving parts controlling the routing of the vehicle along respective paths is housed within the vehicle itself, rather than exposed on the track network to greatly improve the reliability of operation by reducing the exposure of the moving parts to the factory environment.

Since the on-board switching control can be operated with relatively simple electrically activated controls or passive magnetic field generating permanent magnets, the invention also has the advantage of eliminating or at least greatly reducing the extent of wiring along the track network.

The mechanical guiding of the vehicle greatly lessens the possibility that a vehicle will leave the track network and get "lost".

In the unlikely event a vehicle does leave the track network, a failsafe control will discontinue propelling drive of the vehicle.

DETAILED DESCRIPTION

FIGS. 1-14 show the details of a first embodiment of the arrangement according to the present invention.

FIGS. 17 and 18 show a bumper switch arrangement for use with the vehicle.

FIG. 1 is a schematic view of a conveyor system according to the present invention, including a track network and self propelled, selectively delivered pallet vehicles guided thereon to load and unload stations.

FIG. 1A is a plan view of the track network incorporated in the conveyor system depicted in FIG. 1.

FIG. 2 is a fragmentary sectional view through a surface track segment of the track network shown in FIG. 1.

FIG. 3 is an enlarged fragmentary plan view of a portion of the track network shown in FIG. 1 adjacent to divergent selective delivery branch sections thereof.

FIG. 4 is a fragmentary sectional view taken along the line 4—4 in FIG. 3 showing a recessed slot section.

FIG. 5 is a fragmentary sectional view taken along the lines 5—5 in FIG. 3 showing a cam ramp for resetting the guide pins.

FIG. 6 is an enlarged plan view of the supporting wheels included in each self propelled pallet vehicle and adjacent track sections.

FIG. 7 is a plan view of the self propelled pallet vehicle used with the conveyor system of FIG. 1.

FIG. 8 is a fragmentary partially sectional rear view of the self propelled pallet vehicle shown in FIG. 7.

FIG. 9 is an enlarged side elevational view of the drive truck assembly included in the self-propelled pallet vehicle shown in FIGS. 7 and 8 with an adjacent surface track section.

FIG. 10 is a front elevational view of the truck plate and components carried thereon with a sectional view of a mating surface track segment.

FIG. 11 is a fragmentary front view of the guide plate and truck plate included in the truck assembly shown in FIG. 9.

FIG. 12 is a view of the section 12—12 taken through the guide plate shown in FIG. 11.

FIG. 13 is a front elevational view of the idler truck assembly shown in FIG. 6 with a fragmentary view of adjacent pallet vehicle housing structure and surface track segment.

FIG. 14 is a side elevational view of the structure shown in FIG. 13.

FIG. 15 is a front elevational view of a self-propelled pallet vehicle shown in FIG. 1 illustrating the installation of floor wiping brushes in engagement with track segment and adjacent floor areas.

FIG. 16 is a plan view illustrating the brush mounting arrangement shown in FIG. 15.

FIG. 17 is a fragmentary plan view of one end of a self-propelled pallet vehicle according to the present invention illustrating a bumper switch arrangement.

FIG. 18 is an enlarged side elevational view of certain components of the bumper switch arrangement shown in FIG. 16.

FIG. 19 is a plan view of a track network and self propelled pallet vehicles of an alternate embodiment of the conveyor system according to the present invention.

FIG. 20 is an enlarged plan view of a self propelled conveyor vehicle and associated track rail included in the conveyor system shown in FIG. 19.

FIG. 21 is a fragmentary elevational view of the conveyor vehicle and track shown in FIGS. 19 and 20.

FIG. 22 is a plan view of the conveyor vehicle and track shown in FIGS. 19–21 negotiating a curve, illustrating the guiding action of the supporting wheels.

Figure 7:
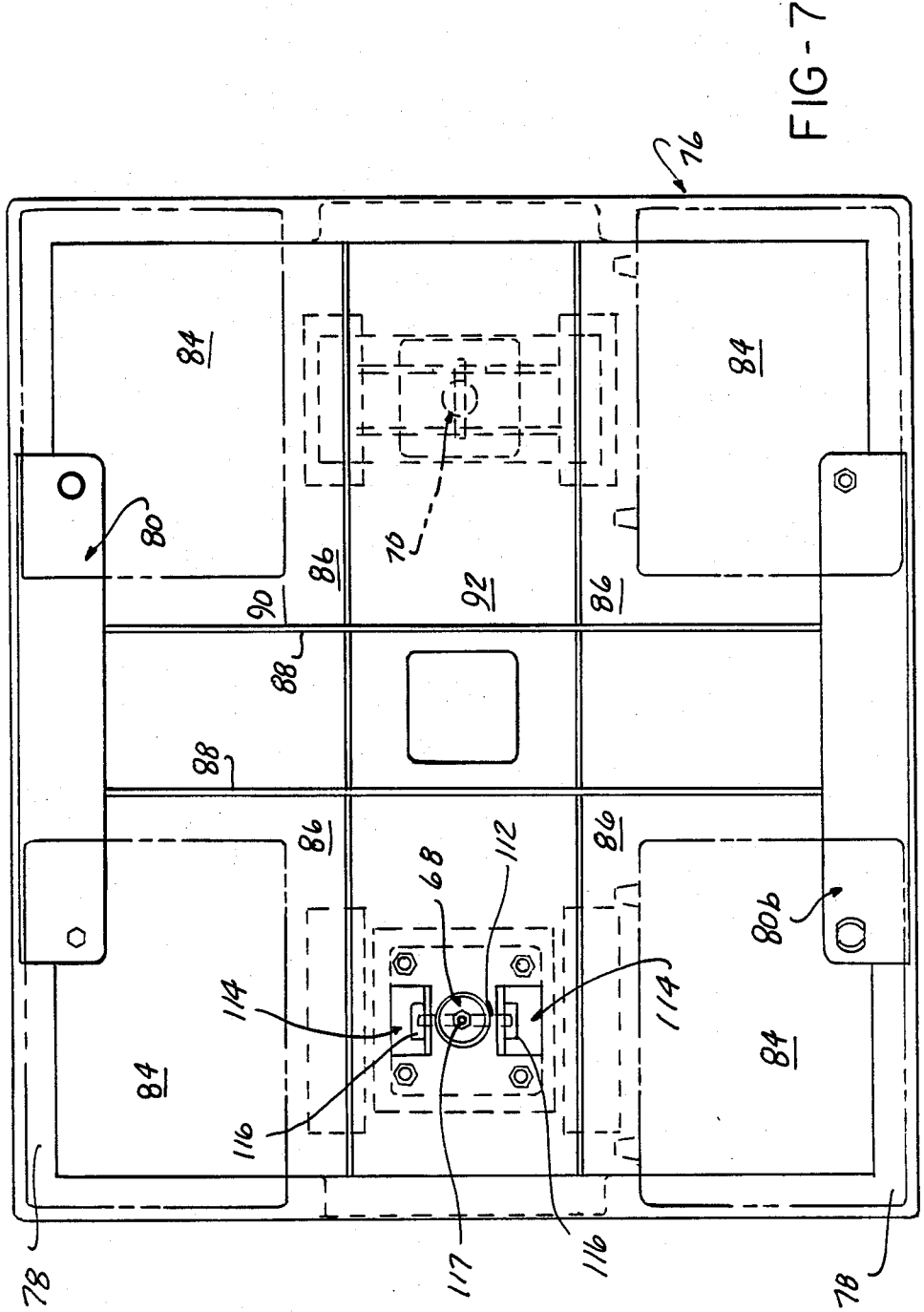

FIG. 1 illustrates a simple installation of a track network 10 for guiding a series of self-propelled pallet vehicles 12 along a path between a work station 14 and a second work station 16, whereat loader and unloader robots 15 may be positioned.

Each of the self propelled pallet vehicles 12 is provided with a fixture plate 18 on which a part W is mounted to be carried to various workstations (not illustrated) where various operations are to be performed on the part W.

The track network 10 includes one or more branch track sections 20 which diverge from straight main track sections 22 to enable selective delivery of parts W on pallet vehicles 12 to alternate locations along the track network for any of various purposes, such as to selectively perform only certain operations on certain workpieces or to enable storage or battery charging of selected pallet vehicles 12.

FIG. 2 illustrates the details of the surface track rails 24 included in the track network 10 comprising opposed pairs of elongated track pieces 26, of metal or plastic, securely anchored in the floor 28 as by expansion type concrete anchors 30 receiving bolts 31. A space therebetween, together with the surface 34 of the floor 28, defines a slot 32. The track pieces 26 are formed with a laterally inclined side surface 25 ending in an upper horizontal surface 27.

FIG. 3 illustrates the details of the components of the track network 10 in the regions adjacent the point of divergence of a branch section 20 from a main section 22.

These include a flush mounted track main portion 36a included in the main circuit section 22 just upstream of the branch track section 20, and flush mounted branch track portions 36b, and flush mounted branch track portion 36c each just downstream of the junction 38 thereof.

The surface mounted rails 24 are provided with downward sloping transition pieces 40a at the juncture with the next adjacent flush mounted main track portion 36a and upward sloping transition pieces 40b, 40c at the downstream juncture of the flush mounted main and branch track portions 36b, 36c with the next following surface mounted track rails 24.

FIG. 4 shows that the flush mounted track portions 36 are recessed into the surface 34 of the floor 28, formed by parallel side plates 42 welded to a bottom plate 44 to form a slot 46 recessed below the surface 34 of the floor 28. Located at the junction 38, is a cam plate 48 fastened to the bottom plate 44. Cam plate 48 partially fills the slot 46 and acts to block entrance of a guide roller 50, drawn in phantom, when in a lowered position shown, but not when the guide roller 50 is in an elevated position, so that entrance to flush mounted main track portion 36c is blocked when the guide roller 50 is lowered, and causes it to enter flush mounted branch section 36b. When the guide roller 50 is elevated, it may freely enter flush mounted main section 36c.

FIG. 5 shows that the exit transition 40b has mounted therein a reset cam 52 having a surface sloping up from the top of bottom plate 44 to the surface 34 of the floor 28.

FIG. 6 shows the layout of the wheels supporting each self propelled pallet vehicle 12.

This includes a pair of outrigger wheels 54a, 54b, each located on one side of the pallet vehicle 12 adjacent the outside edge thereof at the midpoint of the pallet vehicle 12.

A pair of relatively closely spaced driven truck wheels 56a, 56b are mounted to a driving truck assembly 58 at one end of the pallet vehicle 12, adapted to straddle the surface track rails 24, while a pair of idler truck wheels 60a, 60b are mounted to an idler truck assembly 62 located at the other end of the pallet vehicle 12.

An elevation locating roller 64a, 64b is mounted at the either end of the drive truck assembly 58, while a roller 66a, 66b is mounted at the either end of the idler truck assembly 62.

The elevation locating rollers 64a, 64b, 66a, 66b are centered to ride atop the surfaces 27 of the track rails 24, on either side of the slot 32, to locate the vertical position of guide pins to be described.

Each of the outrigger wheels 54a, 54b are mounted for rotation about a fixed axis, but the truck wheels 56a, 56b and 60a, 60b swivel about a vertical axis defined by truck pivot shafts 68 and 70 respectively to enable steering of the pallet vehicle 12.

The pivoting of the driving truck assembly 58 and idler truck assembly 62 is controlled by fore and aft pairs of guide pins 72a, 72b and 74a, 74b which extend into the slot 32 and are constrained in their movement thereby to steer the pallet 12 along the path defined by the track network 10.

FIG. 7 illustrates various constructional details of the pallet vehicles 12. The construction is basically of formed sheet metal defining a box like housing structure 76, with an upper flange 78 having a pair of fixture plate mounting plates 80a, 80b welded thereto.

The pallet vehicles 12 are self propelled, and a battery power source is preferred for a DC drive motor 82 (FIG. 6 drivingly engaged with the drive wheels 56a, 56b.

Accordingly, a set of rechargeable batteries 84 are provided in respective battery compartments 86 formed by four quadrants defined by a pair of vertical partition plates 88 welded transversely within the housing structure 76 and a floor plate 90 welded horizontally within the housing structure 76. Floor plate 90 is formed with a central tunnel 92, with the truck assembly pivot pins 68 and 70 mounted within the tunnel 92.

Figure 8:
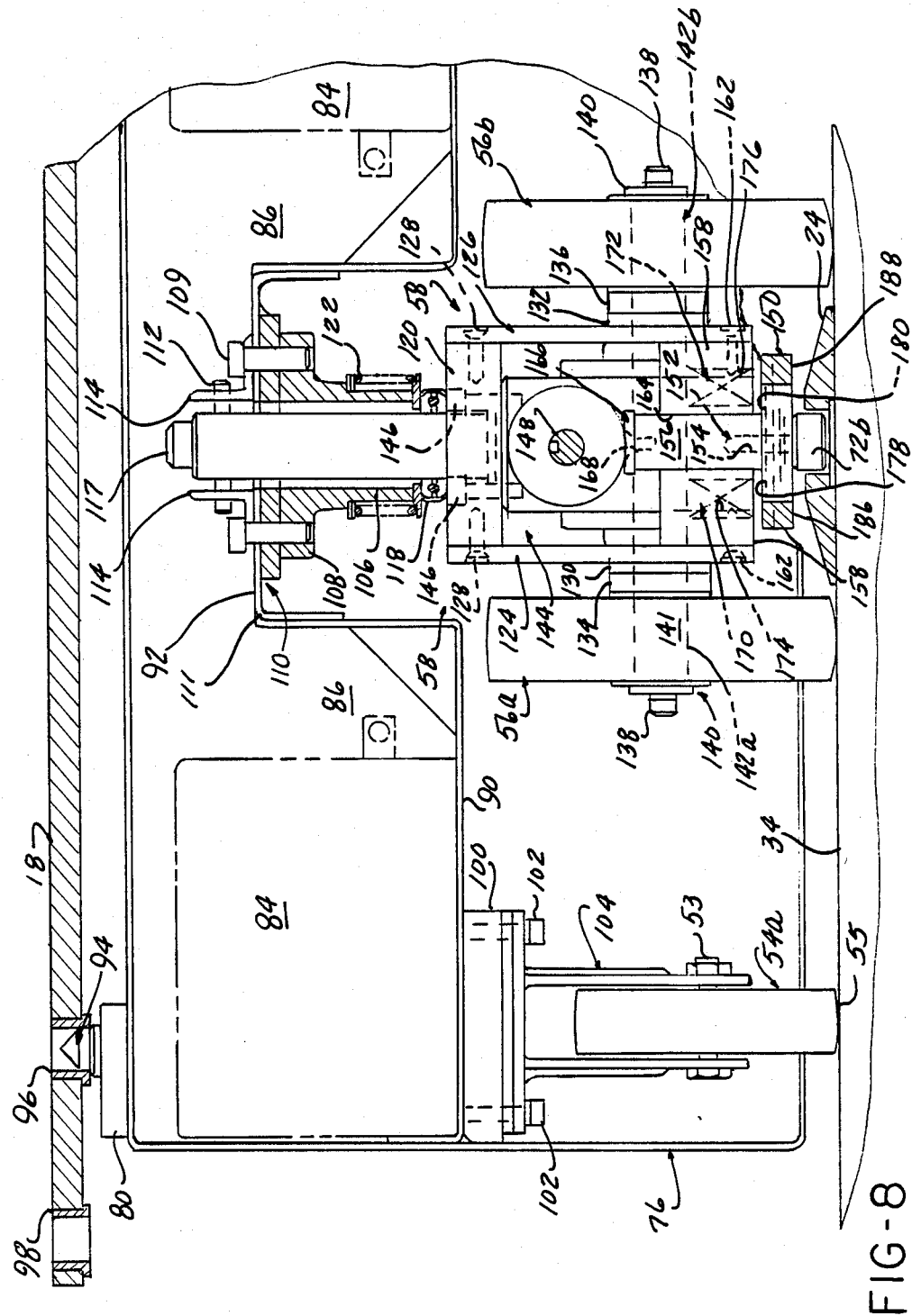

FIG. 8 illustrates that the floor plate 90 is positioned approximately at mid level within the housing structure 76, above which are located the batteries 84, and below which the various running gear components are disposed.

The mounting plates 80 are each formed on upwardly extending pairs of locating pins 94, having a tapered end received within locating bushings 96 in the fixture plate 18 when the fixture, plate is placed on the pallet vehicle 12, as by the loader 15.

Additional locating bushings 98 are provided outboard to allow locating on loading apparatus (not shown). The outrigger wheels 54a, 54b are mounted beneath floor plate 90 by means of a mounting plate 100 welded thereto receiving capscrews 102 securing the caster housing 104 rotatably mounting axle assemblies 53 for a respective wheel 54a, for running on the floor surface 34.

The slightly cambered running surface 55 insure line contact during rolling, tending to eliminate tracking and consequent scrubbing, and makes turning maneuvers easier despite the fixed axis of rotation of the outrigger wheels 54a, 54b.

As noted, the driving truck assembly 58 is mounted for swiveling about a vertical pivot axis defined by a pivot shaft 68 received in a sleeve bearing 106 carried in a flange housing 108 secured beneath tunnel 90 with capscrews 109, spacer plate 110 and reinforcement channel 111 distributing the load into the sheet metal of tunnel 92.

The pivoting action of each truck assembly 58 and 62 is limited to prevent uncontrolled swiveling of the truck wheels 54a, 54b and 60a, 60b.

This is accomplished with respect to drive truck assembly 58 by a cross pin 112 passed through the upper end of the pivot shaft 68 retained with screw 117. Cross pin 112 has ends received in angle pieces 114 secured beneath capscrews 110, with cutouts 116 (FIG. 7) allowing limited rotation of cross pins 112.

The thrust loads are absorbed by thrust bearing 118 interposed between the sleeve bearing 106 and a top plate 120 forming part of the drive truck assembly 58, with a preloading spring 122 urging the truck assembly 58 downward to insure that wheels 56a, 56b maintain contact with the surface 34 despite any bouncing of the pallet vehicle 12. Cross pin 112 limits downward movement to prevent the drive truck assembly 58 from being separated from the pallet vehicle 12.

Wheels 56a, 56b an axially located by on locking collars 130, 132 secured on either side of a right angle reducer drive 144 on through output shaft 141, with spacers 134, 136, 140 locating the spacing of the wheels 56a, 56b so as to straddle the surface track rails 24 as shown. Screws 138 bearing on washers 140 retain the wheels 56c, 56b on respective ends 142a, 142b of the output shaft 141 of the right angle reducer drive unit 144 secured with screws 146 beneath top plate 120.

Right angle reducer drive. unit. 144 may be of a commercially available type (HUB City Series 210 Model 212) using worm gearing to produce 60:1 reduction of rotation of an input shaft 148 on the output shaft 141, input shaft 148 driven by DC motor 82 (FIG. 6).

Both the leading and trailing guide pins 72a, 72b are preferably cam rollers to reduce friction and wear resulting from contact with the track segments 24. The trailing guide pin 72b shown in FIG. 8, is mounted to a truck guide plate 150, which also supports the elevational locating rollers 64a, 64b (FIG. 6) having a support stem 152, threaded into a bore 154 formed in a rear vertical guide bar 156 attached thereby to the upper surface of the guide plate 150.

Side portions 158, of a rear guide block 160 are secured with screws 162 to the inside of side plates 124, 126 fastened to top plate 120 with screws 129 to leave a slot 164 therebetween, which slidably receives the guide bar 156 to enable up and down movement of the truck guide plate 150. A cap plate 166 is secured to the top of the guide bar 156 with a screw 168 to prevent the guide bar 156 from slipping out entirely when the pallet vehicle 12 is lifted during incidental handling.

The trailing end of the truck plate 150 and parts mounted thereto are urged downward from the other drive truck assembly components by a pair of compression springs 170, 172 received in bars 174, 176 in the portions 158 of rear guide block 160 respectively and engaging the recesses 178, 180 in the upper surface of the truck plate 150.

Figure 9:
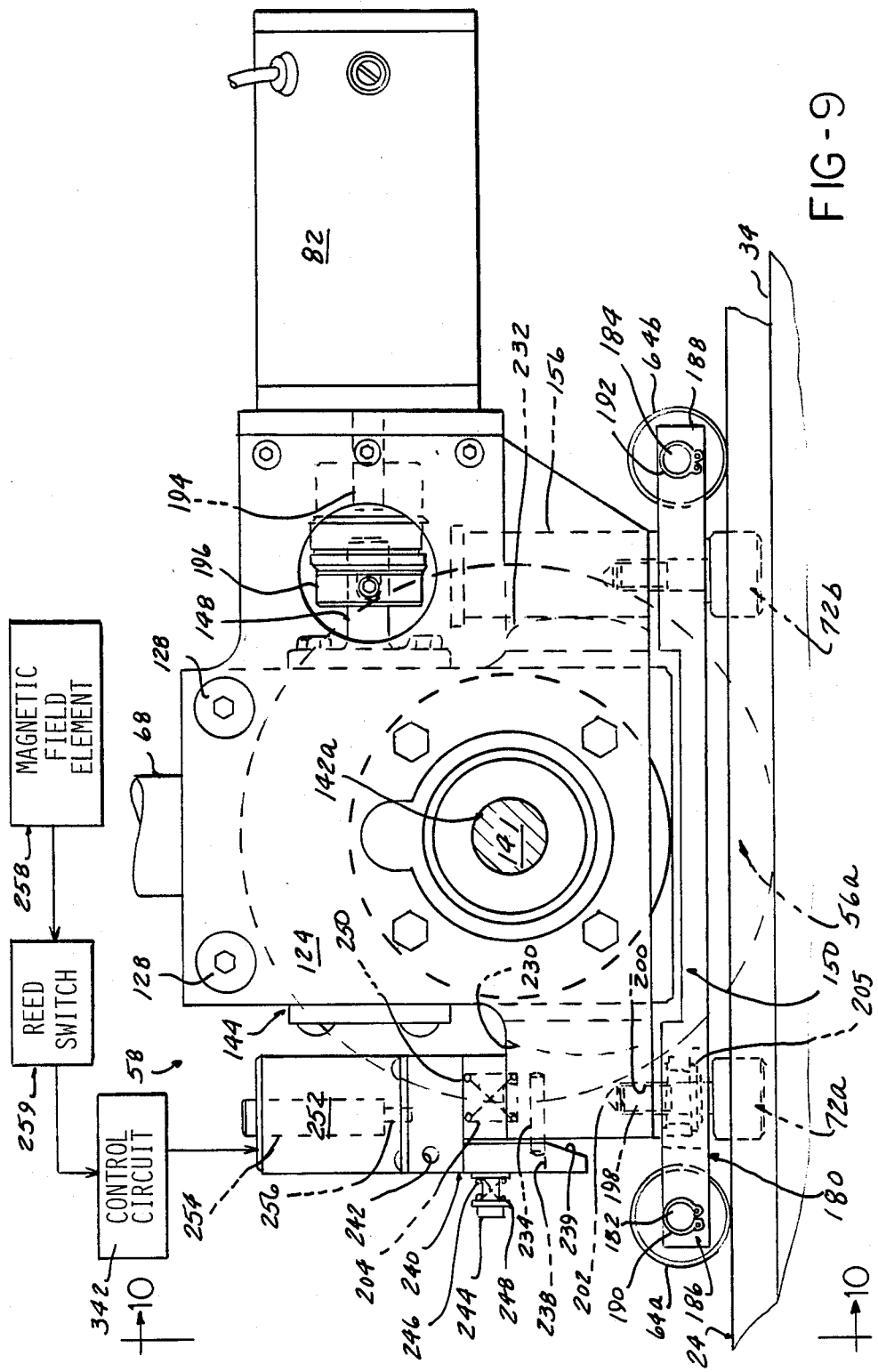

FIG. 9 shows that the elevational locating rollers 64a, 64b are rotatably mounted at the front and rear ends of the truck plate 150 on axle shafts 182, 184 received in clevis ends 186, 188 respectively and retained with snap rings 190, 192.

The drive motor 82 has an output shaft 194 drivingly connected to the input shaft 148 of the right angle drive 144 by means of a coupling assembly 196.

FIGS. 9 and 10 show that the forward guide pin 72a is also carried on the truck guide plate 150, but is relatively movable up and down. The forward guide pin 72a has a threaded stem 198 received in a mating threaded bore 200 formed in a pin 202 received in a forward guide pin 204 inserted into the truck guide plate 150 pin 202 retained with snap ring 205. The forward guide bar 204 is received in a central slot 206 formed in a guide block 208 having block portions 210, 212 affixed with screws 214 to side plates 124, 126.

The forward end of the truck guide plate 150 is also urged downward with compression springs 216, 218 received in bores 220, 222 formed in forward guide block 208. Compression springs 216, 218 are also seated against recesses 224, 226. A clearance bore 228 accommodates the up and down movement of the forward guide pin 72a.

The truck plate 150 is thus able to independently be lowered at either its front or rear as the rollers 64a, 64b, descend from a surface mounted rail segment 24 to a flush mounted track portion 36 or ascend in reverse fashion.

FIG. 12 best illustrates that in order to accommodate the resultant tilting of the forward guide bar 204, slot 206 is curved at its bottom 230. The bottom 232 of slot 164 is also radiused to accommodate tilt of guide bar 156.

The forward guide pin 72a, as noted is arranged so as to be movable between a raised and lowered position to enable selective delivery of the pallet vehicle 12 along the track network 10.

FIGS. 9 and 10 best illustrate the details of the arrangement in which the slide 202 carries a horizontally projecting dowel pin 234 extending through an inner slot 236 formed in the forward guide bar 204 and an outer slot 238 formed in a latching lever arm 240. Latching lever 240 is pivoted about dowel pin 242. The pivoting motion is limited by a capscrew 244 threaded into forward slide bar 240. A compression spring 246 is retained beneath a washer 248 and urges the latching lever arm 240 to the position shown in FIG. 9 with the dowel pin 234 received in outer slot 238.

The slide 202 is urged downward by a compression spring 250, but is held in an up position as long as the dowel pin 234 remains in slot 238.

A solenoid 252 is mounted atop the forward guide bar 204, with a core rod 254 driving an actuating rod 256. When the solenoid 252 is energized, the latching lever arm 240 is engaged by rod 256 to pivot and release the dowel 234 free of slot 238, allowing the compression spring 250 to drive the guide pin 72a to the lowered position shown in phantom in FIG. 4.

In the lowered position the guide pin 72a engages the switching cam 48 to steer the truck by pivoting about shaft 68 into the branch track section 20 (FIG. 1,3).

Energization of the solenoid 252 can be simply controlled by a magnetic field generating element such as a permanent magnet 258 manually positioned just upstream of the junction 38 so as to trigger a reed switch 259. The reed switch 259 in turn interacts with the control circuit 342 to energize the solenoid 252. Alternatively photoemitter devices at the junction 38 sensed by photodetectors on the pallet vehicle 12 may be used to trigger energization of the solenoid, in a fashion broadly similar to the use of photoemitter and detectors to control the movement of the pallet vehicles in copending U.S. Ser. No. 922,497 filed on Oct. 23, 1986. An electromagnetic coil (not shown), selectively energized, could be utilized as the magnetic field generating element.

After traversing the branch segment 20, the reset cam plate 52 forces the guide pin 72 upward, camming the latching lever 240 by engagement with the ramp surface 239, until the slot 238 again captures pin 234.

Figure 14:
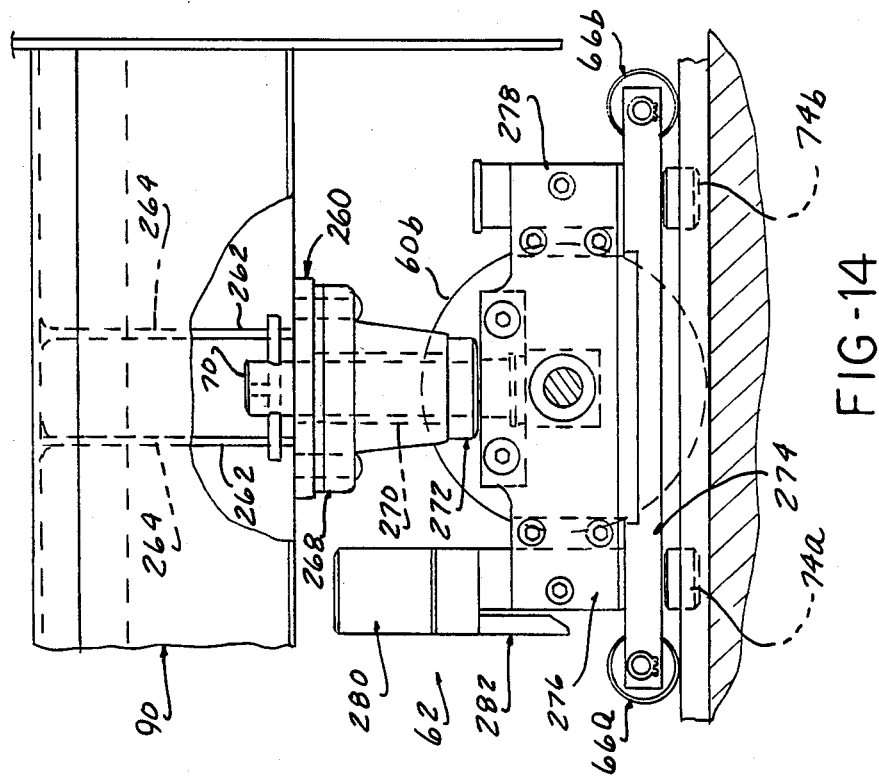
Figure 13:
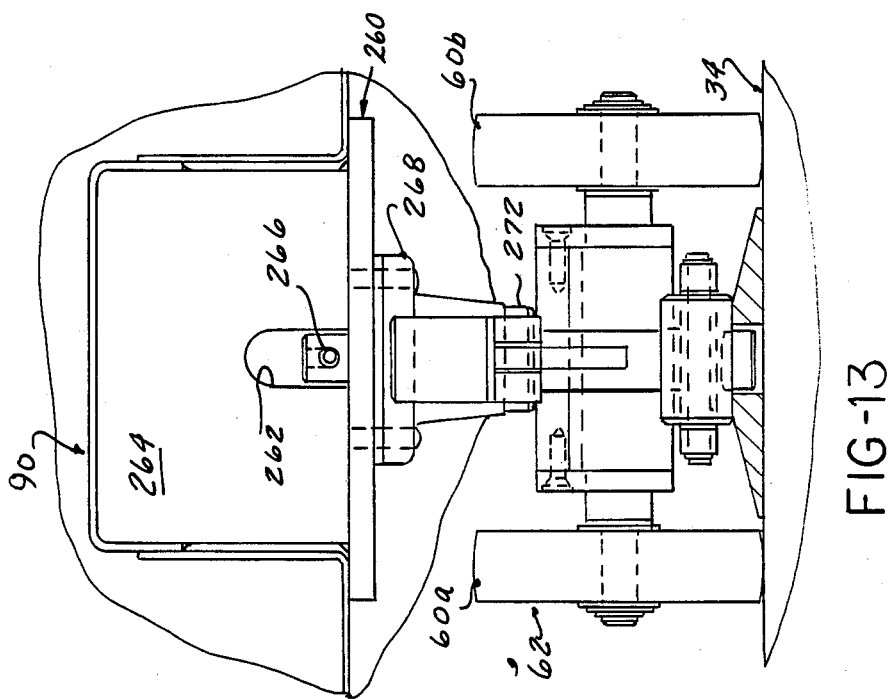

FIGS. 13 and 14 show the details of the idler truck assembly 62, which is mounted to a plate 260 fixed spanning tunnel, with the pivot shaft 70 extending into a cutout 262 in a pair of partitions 264. A cross pin 266 protrudes through the exposed end of pivot shaft in a direction orthogonal to cross pin 112, to limit swiveling of idler truck 62.

The pivot shaft 70 is housed in a flange bearing housing 268 received in a sleeve bearing 270 and thrusting bearing 272.

The idler truck assembly 62 is not driven but mounts the forward and rear elevational locating rollers 66a, 66b on a truck plate 274 as well as the forward and rear guide pins 74a, 74b on a forward guide bar 276 and rear guide bar 278 in similar fashion as the drive truck assembly 58.

The forward guide pin 74 is movable between raised and lowered positions by means of a solenoid 280 and a latching lever arm 282, and other components as in the driver truck assembly 58.

The pallet vehicle 12 according to the present invention is adapted to run on surfaces relatively open to a factory environment. It is thus desirable to minimize the debris over which the various wheels run which may cause tilting of the pallet vehicles 12 and disengagement of the guide pins. This may be accomplished by a series of brushes at either end of the pallet vehicle 12.

Figure 15:
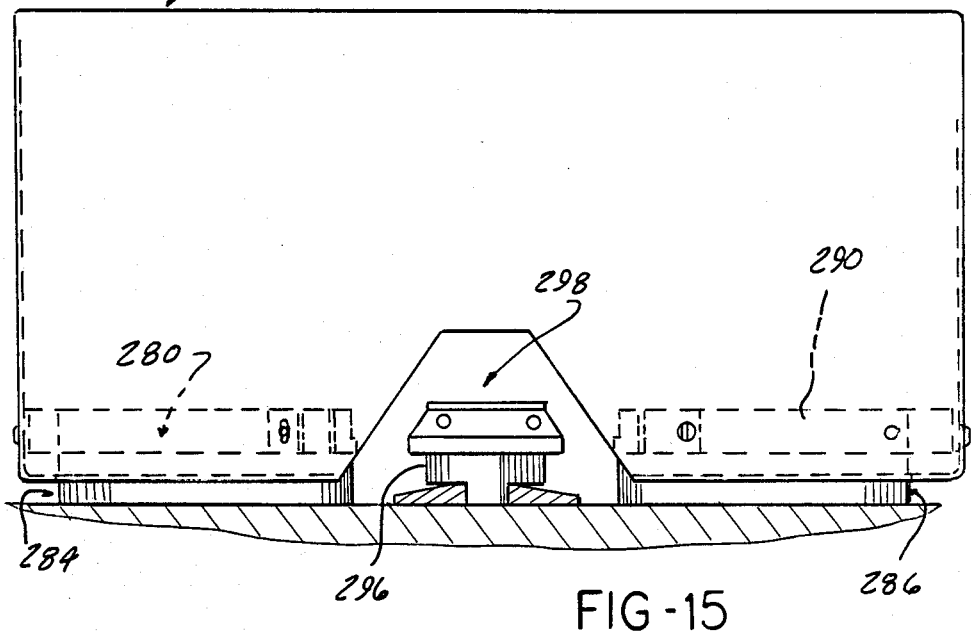
FIGS. 15 and 16 show a floor brush arrangement for use with the vehicle.
Figure 16:
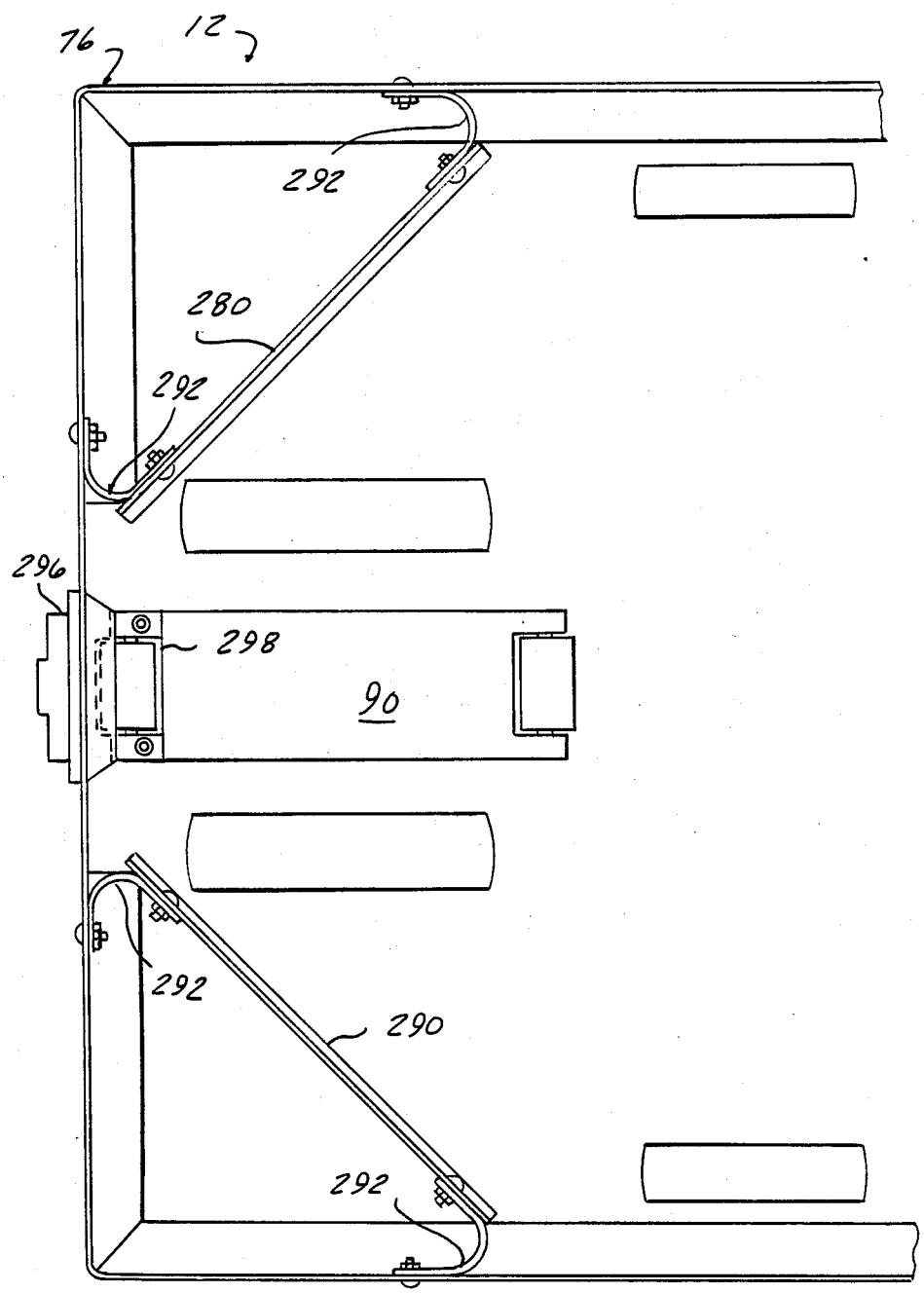

FIGS. 15 and 16 show a suitable arrangement in which a pair of relatively wide side brushes 284, 286 are mounted and either side with brackets 288, 290 angled to the corners with curved mounting pieces 292, 294 fastened to the housing structure. A tee-shaped brush 296 is centrally mounted aligned with the track rail 24 by a bracket 298 fixed in the tunnel 90. The angled side brushes 284, 286 will tend to move debris to one side as the pallet vehicle 12 moves along.

An electrical control system for a battery powered, self propelled pallet vehicles is disclosed in copending U.S. Ser. No. 922,497 filed on Oct. 23, 1986 referred to above, based on photoelectric detectors sensing the presence of a pallet vehicle ahead so as to enable "accumulation" of pallet vehicles 12 upstream of a particular station.

The present invention contemplates movement of self propelled pallets 12 through relatively open floor areas of factories and there is a greater possibility of encountering obstacles (or people) which move only partially into the path of the pallet.

At the same time, conventional bumper switching results in impacts which interfere with accurate positioning of the vehicle.

For this reason, a very low force "bumper" switch arrangement has been devised for use with the vehicles forming a part of the present invention.

Figure 17:
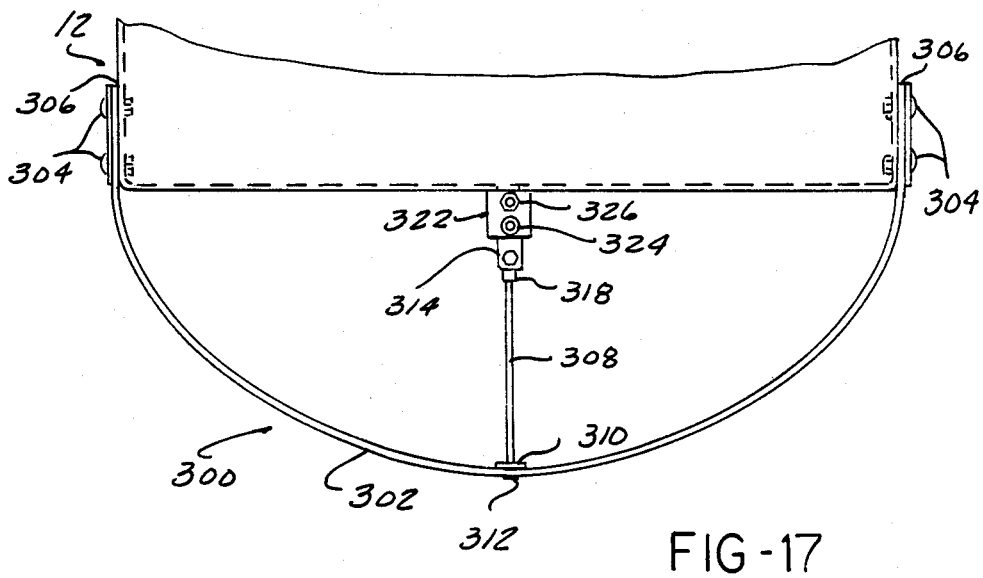

FIGS. 17 and 18 illustrate such a bumper switching arrangement 300, mounted to one end of a pallet vehicle 12, which arrangement includes a flexible band 302 as the triggering member. The flexible band 302 comprises a stiff but not rigid strip affixed with screws 304 and plates 306 to either side of the front end of pallet 12 so as to extend in a wide arc lying ahead of the pallet vehicle 12.

A length of cable 308 is affixed to the mid point of the flexible band 302, as with a plate 310 and screws 312, so as to be under tension, stretched taut as viewed in FIG. 18.

The opposite end of the cable 308 is attached to a rotary switching blade 314, as with bolt and nut 316 and cable fitting 318.

Rotary switching blade 314 is pivotably mounted on a stud 320 rotatably received in a switch block 322, the stud 320 is held at its upper end with a snap fitting 324 and its lower end by nut 326, while switch block 322 is secured to the forward wall 328 of the pallet vehicle 12 by a cap screw 330 received in weldnut 331.

The rotary switching blade 314 is biased to tend to rotate away from the forward extending position shown in FIG. 16 by a torsion spring 332, hooked to the rotary switching blade 314 and switching block 322.

The rotary switching blade 314 has a portion 334 on the opposite side of pivot axis carrying a switching stud 336 having an end adjusted in nut 338 to be closed adjacent to one a proximity switch 340 as long as the rotary blade 314 is held in the straight ahead position by cable 308. Proximity switch 340 is received in the block 322, and controls the powering of the driving motor 82 through suitable circuitry 342.

Accordingly, if the flexible band 302 is deflected at any point, as by contact with an obstacle, slack will develop or the cable 308 will be moved off center, allowing the rotary blade 314 to be rotated by torsion spring 332 out of alignment with the proximity switch 340. This will cause deenergization of the drive motor and stopping of the pallet vehicle 12. Only a very low force is transmitted to the pallet vehicle 12, so that movement of the pallet vehicles 12 can be accurately controlled for accumulation purposes.

The present invention thus allows selective delivery of the pallet vehicles 12 along the track network 10, by mechanical guiding without the need for electromechanical devices in the track network 10.

Figure 19:
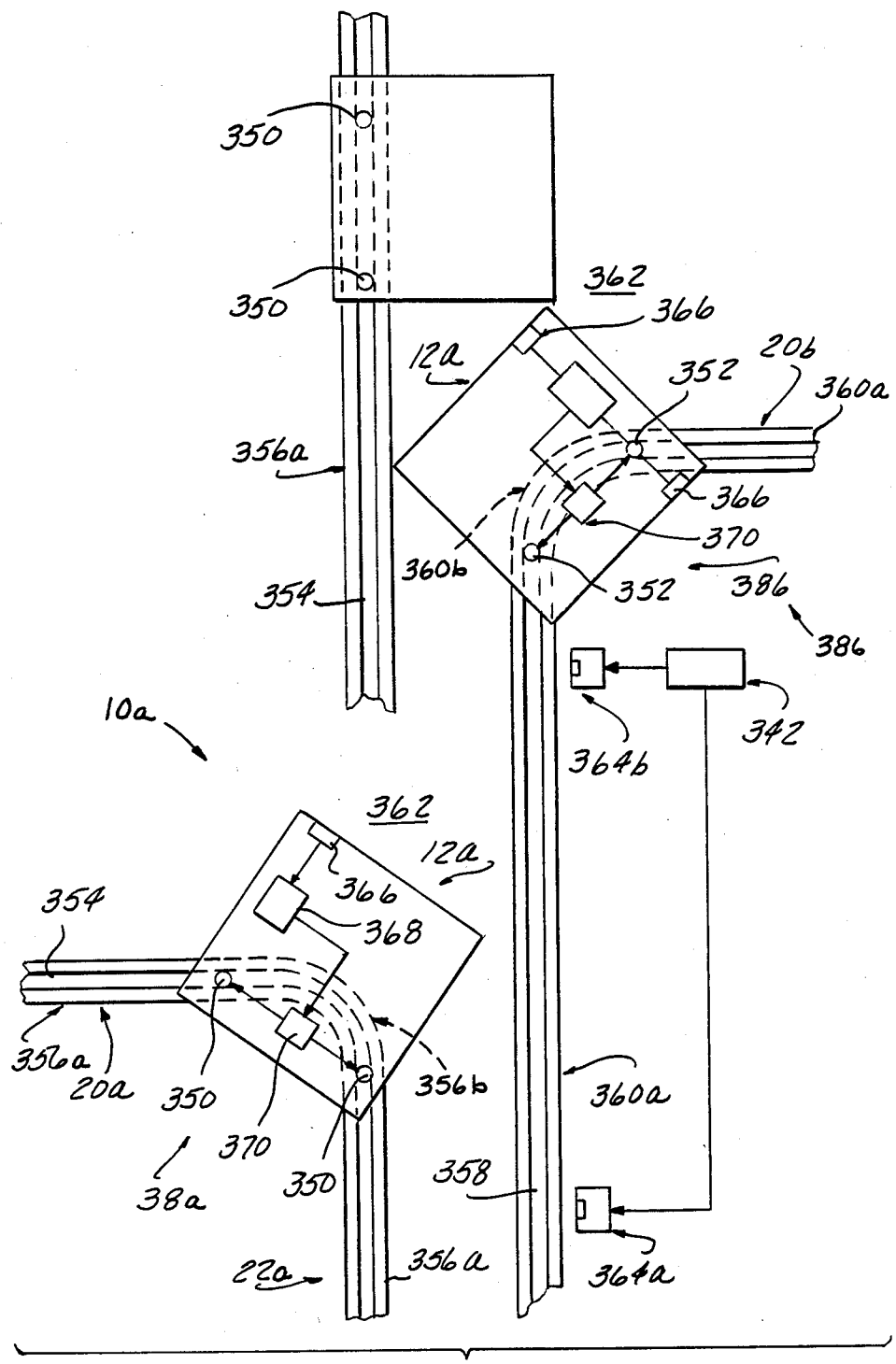
FIGS. 19-22 show the details of a second preferred embodiment of the arrangement according to the present invention.

FIGS. 19–22 illustrate a preferred embodiment of the present invention. FIG. 19 illustrates diagramatically the arrangement of this second embodiment. In this version, the self propelled pallet vehicle 12a is alternatively guided along the track network 10a by a left or right side pair of guide pins 350, 352 mounted on the vehicle 12a to project downwardly into a slot 354 in a left hand rail 356a, or a slot 358 in a right hand rail 360a mounted side-by-side along the track network 10a.

The left hand rail 356a has a curved section 356a extending therefrom diverging away to the left from the opposite rail 360a at junction 38a of a branch section 20a from the main section 22 of the track network 10a, leaving a gap 362 in the left rail 356a in that region, while the right hand rail 360 continues straight and uninterrupted.

If the vehicle 12a is to be guided to the left as shown at junction 38a, the left hand guide pins 350 are pivotally lowered to guide the vehicle 12a to the left, as shown with the guide pins 352 on the right side pivotally raised out of engagement with the slot 358 of the right hand rail 360a to allow the vehicle 12a to execute the left turn. The gap 362 allows the vehicle 12a to pass across the track network 10a without having to pass over the left rail 356a.

Control over the position of the guide pins 350, 352 may be provided at the junction 38a by a photoemitter device 364a positioned along the main section 22, energized by the system controls 342, detected by a photo detector 366 mounted on the side of the vehicle 12a, and acting through on-board control circuit 368 to activate an actuator 370 for the lower left hand guide pins 350.

In the event the vehicle 12a is to remain on the main section 20, the right hand guide pins 352 would be lowered and the left hand guide pins 350 raised at junction 38a.

A right hand branch section 20b is illustrated at junction 38b, with a photo emitter 364b controlled by the system controls 342 energized so as to cause the right hand guide pins 352 to be lowered and the left hand guide pins 350 to be raised, guiding the vehicle 12a to be left as shown at junction 38b.

Figure 20:
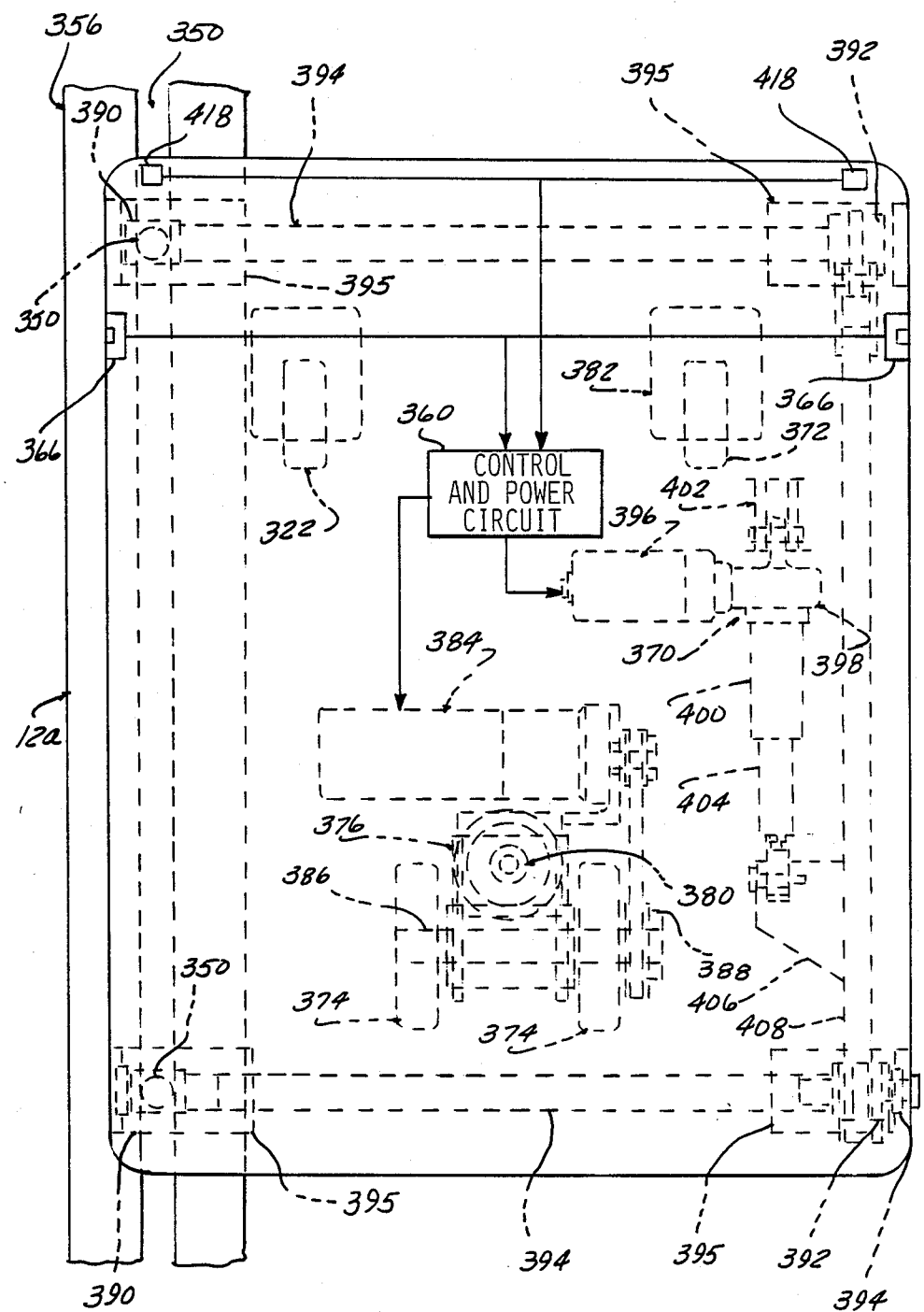
Figure 21:
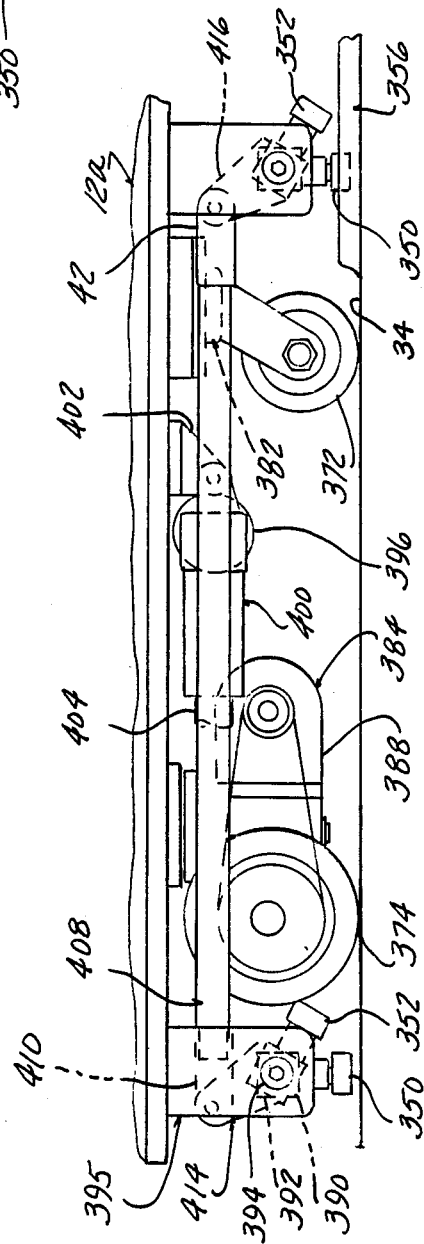

FIG. 20 and 21 illustrate additional details of the vehicle 12a, which is supported on two caster wheels 372 located at one end inboard of the rails 356, 360, and a pair of closely spaced truck drive wheels 374 at the other end of the vehicle 12a. The truck assembly 376 is supported on a shaft 380 to allow pivoting of the wheels 374, while the caster wheels 372 are supported on swivels 382 to likewise be freely pivotable.

The truck wheels 374 are driven to propel the pallet vehicle 12a by a DC drive motor 384 rotating a drive shaft 386 by a pulley and belt arrangement 388.

The left and right side guide pins 350, 352 are arranged to be raised and lowered out of engagement with the respective slots 354, 358 by being fixed to mounting blocks 390, 392 each swinging about pivots 394 supported on brackets 395 located at each corner of the vehicle 12a.

Each of the pairs of mounting blocks 390, 392 at either end of the vehicle 12a are connected to be rotated together by means of cross tubes 394 affixed thereto.

The orientation of the blocks 392 are such that when the left hand pins 350 are vertical, the right hand pins 352 are constrained to be swung up as shown in FIG. 21.

The guide pin actuator 370 comprises an electrical motor 396, gear head 398, and electric cylinder 400 package.

The cylinder 400 is pivotally mounted at one end on an anchor bracket 402 and has an operating rod 404 pinned to a bracket 406 fixed to a swing bar 408. Swing bar 408 in turn is threaded into fittings 410, 412, pivotally mounted to swing arms 414, 416 welded to mounting blocks 392.

Thus actuator 370, when energized by the on board control and power circuit 360, causes either the left or right side guide pins 350, 352 to be raised while the others are lowered. Only one set can be lowered at the same time to preclude a jam condition at branch junctions 38a.

The energization may be carried out be magnetically actuated reed switches as in the above described embodiment, but preferably by means of the photo emitter—photo detector arrangement described above.

An additional fail safe feature may be provided by optical detectors 418 positioned over the rails 356, 360, detecting the accidental departure of a vehicle 12a from the track network 10a, triggering a deenergization of the drive motor 384 by means of the control and power circuit 360.

Figure 22:
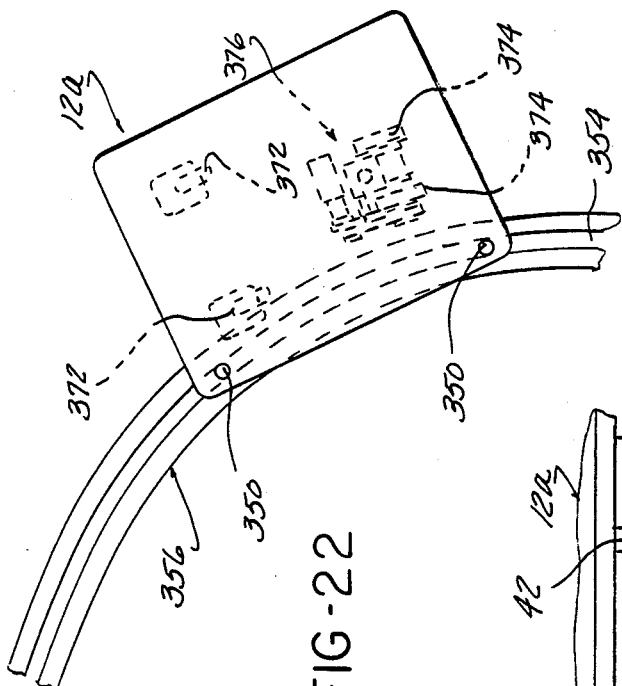

FIG. 22 depicts the vehicle 12a negotiating a left turn, with guide pins 350 engaged in slot 354 of left hand rail 356.

The caster wheels 372 are swung to the left while the track wheels 374 are swung to the right to allow the turn to be negotiated smoothly.

This second embodiment is preferred since the vehicles 12a are constantly engaged with the track slot, which is self cleaning because of the intermittent gaps 362 in the track. The gaps 362 also allow turning into a branch track section 20a without crossing over the rails, to simplify the track configuration and allowing the use of surface mounted rails entirely, obviating the need to cut into an existing floor.

We claim:

1. A selective delivery arrangement for self propelled pallet vehicles (12) guided by a track network (10) located on a surface (34), said track network including a slot (32) extending about said track network (10), each of said self-propelled pallet vehicles (12) supported on wheels (54a, 54b) and carrying means for guiding the vehicles along the track including at least one downwardly projecting guide pin (72a, 72b) engageable with said track network (10) with said wheels (54a, 54b) located on said surface (34), said self-propelled pallet vehicles (12) responsive to the engagement of said guide pins (72a, 72b) to steer the direction of movement of said pallet vehicle (12) along said track network (10), with said pallet vehicles (12) disposed on said surface (34); said track network (10) including a main track section (22) and at least one branch track section (20) diverging from said main track section (22) at a junction (38); and control means for selectively steering each of said pallet vehicles (12) into either said main track section (22) or branch track section (20) at said junction (38); said control means characterized by means (234, 238, 250, 252) for selectively positioning said at least one guide pin (72a, 72b) alternatively in one of two different elevations, and said slot (32) of said track network (10) having a cam plate (48) mounted recessed in said slot (32) engageable with said at least one guide pin (72a, 72b) in a first, lowered elevation to steer said pallet vehicle (12) into said branch track section (20), said at least one guide pin (72a, 72b) in a second raised elevation passing over said cam plate (48) to allow continued movement of said vehicles (12) down said main track section (22), whereby said selective delivery of said vehicles (12) is achieved with raising and lowering of said at least one guide pin (72a, 72b).

2. The arrangement according to claim 1 wherein said control means includes a solenoid (252), and means (238, 234) mounted on said pallet vehicle (12) operatively associating said solenoid (252) with said at least one guide pin (72a), and a magnetic field generating element (258) acting on said solenoid (252) to cause positioning of said at least one guide pin (72a) in one of said alternate different elevations.

3. The arrangement according to claim 2 wherein said control means also includes spring means (250) urging said at least one guide pin (72a) downwardly to said first, lowered elevation and said means operatively associating said solenoid (252) and said at least one guide pin (72a) comprises latching means (238, 234) holding said at least one guide pin (72a) in said raised, second elevation until selectively released to allow said at least one guide pin (72a) to be moved to said first lowered elevation by said spring means (250).

4. The arrangement according to claim 3 wherein said magnetic field generating element comprises a movable permanent magnet (258) positionable at said junction (38) to energize said solenoid (252) to allow selective delivery into said branch track section (20).

5. The arrangement according to claim 3 further including reset cam means (52) located in said branch track section (20) to cam said at least one guide pin (72a) upward to said second raised elevation to be reset thereby.

6. The arrangement according to claim 1 including steering means comprising at least one truck assembly (58) having laterally spaced apart wheels (56a, 56b) straddling said track network (10), and including means (68) mounting said truck assembly (58) pivotably to said pallet vehicle (12) about a vertical axis centered between said wheels (56a, 56b), said truck assembly (58) including a guide plate (150) mounting said at least one pair of guide pins (72a, 72b) and rotatably fixed to said truck assembly (58) to cause steering of said truck assembly (58) about said vertical axis by engagement of said pair of guide pins (72a, 72b) in said track slot (32).

7. The arrangement according to claim 5 wherein said pallet vehicle (12) includes a pair of outrigger wheels (54a, 54b) spaced laterally outward from said truck assembly wheels (56a, 56b).

8. The arrangement according to claim 7 further including a second truck assembly (62) spaced fore and aft to said first mentioned truck assembly (58), said second truck assembly (58) including a pair of laterally spaced wheels (60a, 60b) straddling segments (24) of said truck network (10), and a pair of fore and aft spaced guide pins (74a, 74b) extending downwardly into engagement with said truck network (10), and including means (70) mounting said second truck assembly (62) to said pallet vehicle (12) for rotation about a vertical axis located centrally between said truck wheels (60a, 60b), whereby said pallet vehicle (12) is steered by pivoting of both of said truck assemblies (58, 62).

9. The arrangement according to claim 6 wherein said guide plate (150) is mounted to be movable up and down with respect to said truck assembly (58) and to carry said guide pins (72a, 72b) therewith, further including spring means (170, 172, 216, 218) urging said guide plate (150) downwardly, and also including a pair of elevation locating rollers (64a, 64b) mounted to said guide plate (150) for rolling about axes transverse to said track network (10) and centrally located to run atop said track network (10), whereby said guide pin height is controlled thereby.

10. The arrangement according to claim 9 wherein said slot (32) of said track network (10) descends from a level above said surface (34) at a predetermined distance upstream and downstream of said junction (38) to a level flush with said surface (34) to be recessed below said level of said surface (34) immediately upstream and downstream of said junction (38), whereby said wheels (54a, 54b) of said pallet vehicle (12) are not required to traverse track network portions above said surface (34) in continuing down said main track sections (22) past said branch track section (22), or in turning into said branch track section (22), said guide plate (150) up and down movement maintaining guide pin engagement with said track network (10).

11. The arrangement according to claim 10 wherein each of said track network portions mounted above said surface (34) are laterally ramped, with flat top surfaces (27) on which run said guide plate rollers (64a, 64b).

12. A selective delivery arrangement for self propelled pallet vehicles (12) guided by a track network (10) located on a surface (34), each of said self-propelled pallet vehicles (12) supported on wheels (54a, 54b) and carrying means for guiding the vehicles along the track including at least one guide pin (72a, 72b, 350, 352) engageable with said track network (10) with said wheels (54a, 54b) located on said surface (34), said self-propelled pallet vehicles (12) responsive to the engagement of said guide pins (72a, 72b, 350, 352) to steer the direction of movement of said pallet vehicle (12) along said track network (10), with said pallet vehicles (12) disposed on said surface; said track network (10) including a main track section (22) and at least one branch track section (20) diverging from said main track section (22) at a junction (38); and control means for selectively steering each of said pallet vehicles (12) into either said main track section (22) or branch track section (20) at said junction (38); said control means including means (234, 238, 250, 252) for selectively positioning said at least one guide pin (72a, 72b, 350, 352) alternatively in one of two different positions, and said track network (10) engagable with said at least one guide pin (72a, 72b, 350, 352) in a first position to steer said pallet vehicle (12) into said branch track section (20) and in said second position to allow continued movement down said main track section (22) whereby said selective delivery of said vehicles is achieved with on board components of said vehicles;

- an electrical drive motor (82) for propelling said pallet vehicle (12), and further including bumper switch means (300) for interrupting power to said drive motor (82), said bumper switch means (300) comprising:
- a band (302) of flexible material extending in an arc from one end of said pallet vehicle (12), said band (302) fixed at either end to one side of said pallet vehicle (12);
- a rotary switching blade (314) mounted to said pallet vehicle (12) for rotation about a vertical axis;
- torsion spring means (332) urging said switching blade (314) to rotate about said axis from a straight ahead position;
- a flexible cable (308) fixed at one end to an outboard end of said switching blade (314) and at the other to the inside of said band (302) at a central point straight ahead from said pallet (12), said band (302) exerting a pulling force on said cable (308) to thereby normally hold said switching blade (314) straight ahead; and
- switching means (340, 342) responsive to rotation of said switching blade (314) out of said straight ahead position to interrupt power to said drive motor (82) and stop said pallet vehicle (12).

13. A selective delivery arrangement for self propelled pallet vehicles (12a) guided by a track network (10a) located on a surface (34), each of said self-propelled pallet vehicles (12) supported on wheels (54a, 54b) and carrying means for guiding the vehicles along the track including at least one guide pin (350, 352) engagable with said track network (10a) with said wheels (54a, 54b) located on said surface (34), said self propelled pallet vehicles (12a) responsive to the engagement of said guide pins (350, 352) to steer the direction of movement of said pallet vehicle (12a) along said track network (10), with said pallet vehicles (12a) disposed on said surface; said track network (10a) including a main track section (22a) and at least one branch track section (20a) diverging from said main track section (22a) at a junction (38a); and control means for selectively steering each of said pallet vehicles (12a) into either said main track section (22) or branch track section (20a) at said junction (38); said control means including means (370) for selectively positioning said at least one guide pin (350, 352) alternatively in one of two different positions, and said track network (10a) engagable with said at least one guide pin (350, 352) in a first position to steer said pallet vehicle (12a) into said branch track section (20a) and in said second position to allow continued movement down said main track section (22a);

wherein said track network (10a) is characterized by side by side laterally spaced apart rails (356a, 360a), each having a guide feature (354, 358) extending therealong, said branch track sections (20a) comprising a curved rail section (356b, 360b) extending from one of said spaced apart rails (356, 360) and diverging from the opposite straight rail (356a, 360a), with a gap (362) in said one of said spaced apart rails (356, 360) adjacent said curved section (356a, 360b); and wherein at least one guide pin (350, 352) is mounted on either side of said pallet vehicle (12a) aligned with a guide feature (354, 358) of a respective rail (356a, 360b), each of said guide pins (350, 352) positionable in alternate positions in or out of engagement with said slots (354, 358).

14. The arrangement according to claim 13 wherein said control means includes a photoemitter (364) at said junction (38a) and a photodetector (366) on said pallet vehicle (12a) responsive thereto to cause movement of said at least one guide pin (350, 352) to one of said alternate different positions.

15. The arrangement according to claim 13 wherein said control means includes actuator means (370) for actuating movement of said guide pins (350, 352) between said alternate positions.

16. The arrangement according to claim 15 wherein said guide pins (350, 352) are mounted for swinging movement together in pairs between said alternate positions.

17. The arrangement according to claim 16 further including means (394) constraining opposite pairs of guide pins (350, 352) to assume opposite alternate positions.

* * * * *